(12) United States Patent
Kangas

(10) Patent No.: US 10,150,399 B2
(45) Date of Patent: Dec. 11, 2018

(54) SYSTEM FOR RAISING AND LOWERING VEHICLE

(71) Applicant: EM Solutions Incorporated, Calumet, MI (US)

(72) Inventor: Aaron P. Kangas, Calumet, MI (US)

(73) Assignee: EM Solutions Incorporated, Calumet, MI (US)

(*) Notice: Subject to any disclaimer, the term of this patent is extended or adjusted under 35 U.S.C. 154(b) by 64 days.

(21) Appl. No.: 15/417,479

(22) Filed: Jan. 27, 2017

(65) Prior Publication Data

US 2017/0210268 A1 Jul. 27, 2017

Related U.S. Application Data

(60) Provisional application No. 62/287,737, filed on Jan. 27, 2016.

(51) Int. Cl.
*B60P 1/08* (2006.01)
*B60G 7/00* (2006.01)
(Continued)

(52) U.S. Cl.
CPC .............. *B60P 1/08* (2013.01); *B60G 7/001* (2013.01); *B60G 11/04* (2013.01); *B60G 17/005* (2013.01); *B60G 17/017* (2013.01); *B60G 17/023* (2013.01); *B60G 2202/112* (2013.01); *B60G 2202/413* (2013.01); *B60G 2202/42* (2013.01); *B60G 2202/422* (2013.01); *B60G 2500/30* (2013.01); *B60G 2500/324* (2013.01)

(58) Field of Classification Search
CPC ....... B60P 1/08; B60G 17/005; B60G 17/017; B60G 17/023; B60G 7/001; B60G 2202/413; B60G 2202/42; B60G 2202/422; B60G 2500/324; B60G 2202/112

See application file for complete search history.

(56) References Cited

U.S. PATENT DOCUMENTS 3,915,470 A * 10/1975 Jansen ................. B62D 61/125
180/24.02
4,886,290 A 12/1989 Pourchon et al.
(Continued)

FOREIGN PATENT DOCUMENTS

| CN | 2740448 Y | 11/2005 |
|----|-----------|---------|
| DE | 2807299 A1 | 8/1979 |

(Continued)

OTHER PUBLICATIONS

International Search Report and Written Opinion of the International Searching Authority from corresponding Patent Cooperation Treaty (PCT) Application No. PCT/IB2017/050455, indicated completed on Apr. 25, 2017.

*Primary Examiner* — Darlene P Condra
(74) *Attorney, Agent, or Firm* — Honigman Miller Schwartz and Cohn LLP

(57) ABSTRACT

An apparatus is provided for raising and lowering a vehicle that is supported by a wheel suspended from a frame of the vehicle by a suspension component. The apparatus includes a linear actuator that is vertically oriented to move the wheel of the vehicle relative to the frame of the vehicle. A compression device is arranged to compress the suspension component of the vehicle in response to movement of the wheel by the linear actuator.

18 Claims, 17 Drawing Sheets

(51) Int. Cl.
    *B60G 17/005*     (2006.01)
    *B60G 17/017*     (2006.01)
    *B60G 17/02*     (2006.01)
    *B60G 11/04*     (2006.01)

(56) References Cited

U.S. PATENT DOCUMENTS

| | | | |
|---|---|---|---|
| 5,058,916 A * | 10/1991 | Hicks | B60F 1/046 180/209 |
| 5,142,897 A | 9/1992 | Pischke et al. | |
| 5,211,420 A | 5/1993 | Iwashita | |
| 5,573,266 A | 11/1996 | Zalewski et al. | |
| 5,586,781 A | 12/1996 | Anderson | |
| 5,915,705 A * | 6/1999 | VanDenberg | B60G 9/00 280/43.17 |
| 6,003,885 A * | 12/1999 | Richardson | B62D 61/12 280/86.5 |
| 6,398,236 B1 | 6/2002 | Richardson | |
| 6,454,284 B1 | 9/2002 | Worman, Jr. | |
| 6,481,079 B1 | 11/2002 | Newhan | |
| 6,663,114 B2 | 12/2003 | Lamela et al. | |
| 6,752,406 B2 * | 6/2004 | Pierce | B60G 9/003 280/124.162 |
| 6,824,144 B2 | 11/2004 | Russell et al. | |
| 7,044,482 B2 | 5/2006 | Shore | |
| 7,434,821 B2 | 10/2008 | Hinz | |
| 7,802,801 B2 | 9/2010 | Bartel et al. | |
| 7,922,181 B2 | 4/2011 | Hakui et al. | |
| 7,976,030 B2 | 7/2011 | Michel | |
| 8,522,933 B2 | 9/2013 | Chalin et al. | |
| 8,616,563 B2 | 12/2013 | Lee | |
| 8,641,062 B2 * | 2/2014 | Gottschalk | B60G 9/02 180/24.02 |
| 8,702,109 B2 | 4/2014 | Ryan et al. | |
| 8,807,574 B2 | 8/2014 | Kohlhauser et al. | |
| 8,851,492 B2 * | 10/2014 | Andreasen | B60G 9/003 280/124.116 |
| 9,079,469 B2 | 7/2015 | Dehmel et al. | |
| 9,079,470 B2 | 7/2015 | Slawson | |
| 9,259,986 B2 | 2/2016 | Slawson | |
| 2006/0186616 A1 | 8/2006 | Rudiger | |
| 2007/0029711 A1 | 2/2007 | Ehara et al. | |
| 2011/0285103 A1 | 11/2011 | Louden | |
| 2015/0102568 A1 | 4/2015 | Slawson | |
| 2015/0102569 A1 | 4/2015 | Slawson | |
| 2015/0102572 A1 | 4/2015 | Slawson | |
| 2015/0197130 A1 | 7/2015 | Smith et al. | |

FOREIGN PATENT DOCUMENTS

| | | |
|---|---|---|
| DE | 102010011433 A1 | 6/2011 |
| EP | 0983883 A2 | 3/2000 |
| EP | 1640208 A1 | 3/2006 |
| EP | 2236324 A2 | 10/2010 |
| FR | 2597801 A1 | 10/1987 |
| FR | 3020992 A1 | 11/2015 |
| GB | 860338 | 2/1961 |
| WO | 2004108475 A1 | 12/2004 |
| WO | 2015157832 A1 | 10/2015 |

\* cited by examiner

SYSTEM FOR RAISING AND LOWERING VEHICLE

CROSS REFERENCE TO RELATED APPLICATION

The present application claims the filing benefit of U.S. provisional application, Ser. No. 62/287,737, filed Jan. 27, 2016, which is hereby incorporated herein by reference in its entirety.

FIELD OF THE INVENTION

The present invention relates generally to systems for raising and lowering a vehicle, and more particularly to systems and devices for lowering the body and chassis of a parked vehicle to a desirable height for loading and unloading the vehicle.

BACKGROUND OF THE INVENTION

It is generally understood that vehicles may be equipped with raising and lowering systems, such as with hydraulic or pneumatic actuators, for adjusting the height of the vehicle. Typically, these systems are installed after-market and require significant modification to the vehicle, such as the body structure and the wheel wells. An example of such a system is described in U.S. Pat. No. 4,886,290.

SUMMARY OF THE INVENTION

The present invention provides a system or device that raises and lowers a vehicle chassis relative to the ground surface when the vehicle is stopped, such as for loading and unloading people and/or items from a transport van or other vehicle, which may, for example, be beneficial for loading and unloading wheel chairs, stretchers, and other medical or personal assistance equipment. In accordance with the present invention, the system or device compresses at least one suspension component of a vehicle, while lowering the chassis with an actuator, such as a pneumatic or hydraulic cylinder. By compressing the suspension component beyond the load applied by gravity, the system or device allows the chassis to be lowered and the vehicle's wheel to be moved into the available space provided at an upper area of the wheel well, without necessarily modifying the vehicle body structure or wheel well. The device or system can optionally be mounted onto an existing rear leaf spring suspension system of the vehicle with bolts or other fasteners, without cutting, welding, painting, or otherwise modifying the existing vehicle chassis or body structure.

In accordance with an aspect of the present invention, an apparatus is provided for raising and lowering a vehicle that is supported by a wheel suspended from a frame of the vehicle by a suspension component. The apparatus includes a linear actuator that is vertically oriented to move the wheel of the vehicle relative to the frame of the vehicle. A compression device is arranged to compress the suspension component of the vehicle in response to movement of the wheel by the linear actuator.

In accordance with another aspect of the present invention, an apparatus or device is provided for raising and lowering a vehicle that includes a linear actuator having a base portion attached at or near a suspension component of the vehicle. A movable portion of the linear actuator is operably coupled with the base portion and is configured to mount or support a wheel assembly. A flexible connector, such as a metal cable or fabric strap or the like, attaches between the movable portion of the actuator and the chassis of the vehicle, whereby an intermediate section of the flexible connector is movably engaged or otherwise threaded around or through a coupling, such as a roller or pulley, secured at the suspension component. The linear actuator operates to lower the chassis from its loaded or driving position to a first lowered position by moving the wheel assembly toward the chassis, where the flexible connector is placed in tension, and to a second lowered position by moving the wheel assembly further toward the chassis, where the suspension component is compressed toward the chassis by the flexible connector.

These and other objects, advantages, purposes and features of the present invention will become apparent upon review of the following specification in conjunction with the drawings.

DESCRIPTION OF THE PREFERRED EMBODIMENTS

Figure 7:
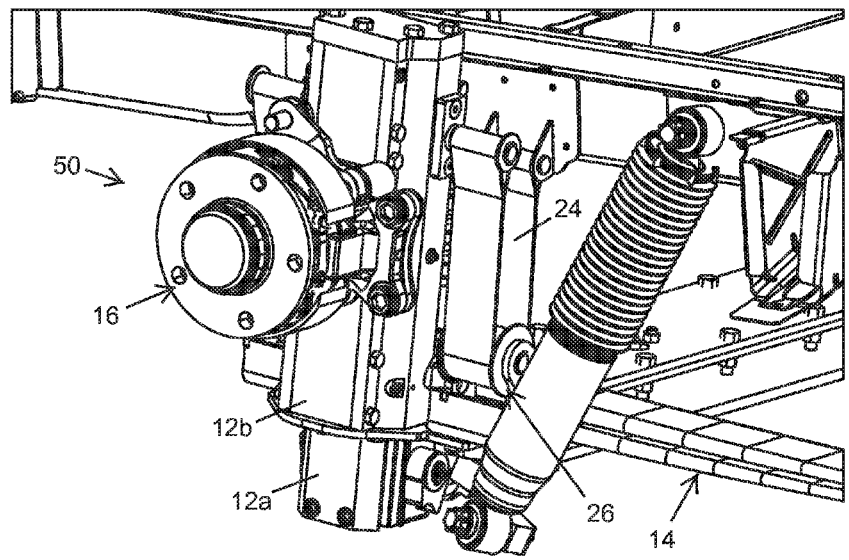
FIG. 7 is a perspective view of the system shown in FIG. 6, illustrating the chassis at a first lowered position or a position that has generally not compressed the suspension component.

Referring now to the drawings and the illustrative embodiments depicted therein, a vehicle height adjustment system or apparatus or device 10 includes a pair of actuators 12 that are mounted between a suspension component 14 of a vehicle and a hub assembly 16 that rotatably supports a rear wheel assembly 18 at respective sides of the vehicle. The actuator 12 of the device 10 operates to raise and lower a respective side of a chassis 20 or structural frame of the vehicle relative to the ground surface, such as when the vehicle is stopped for loading and unloading people and/or items. As shown in FIG. 7, the actuator 12 comprises a suspension or base portion 12a that is generally fixed relative to the suspension component 14 and a wheel or movable portion 12b that is generally fixed relative to the hub assembly 16. The actuator 12 is shown as a hydraulic actuator, although it is contemplated that it may include a pneumatic actuator or other form of mechanical actuator that is capable of raising and lowering the vehicle. The actuators function to vertically raise and lower the chassis relative to the wheel assemblies without rotating the wheel assemblies and wheels, thus allowing the device or system to raise and lower the chassis while the parking brake of the vehicle is applied.

Figure 3:
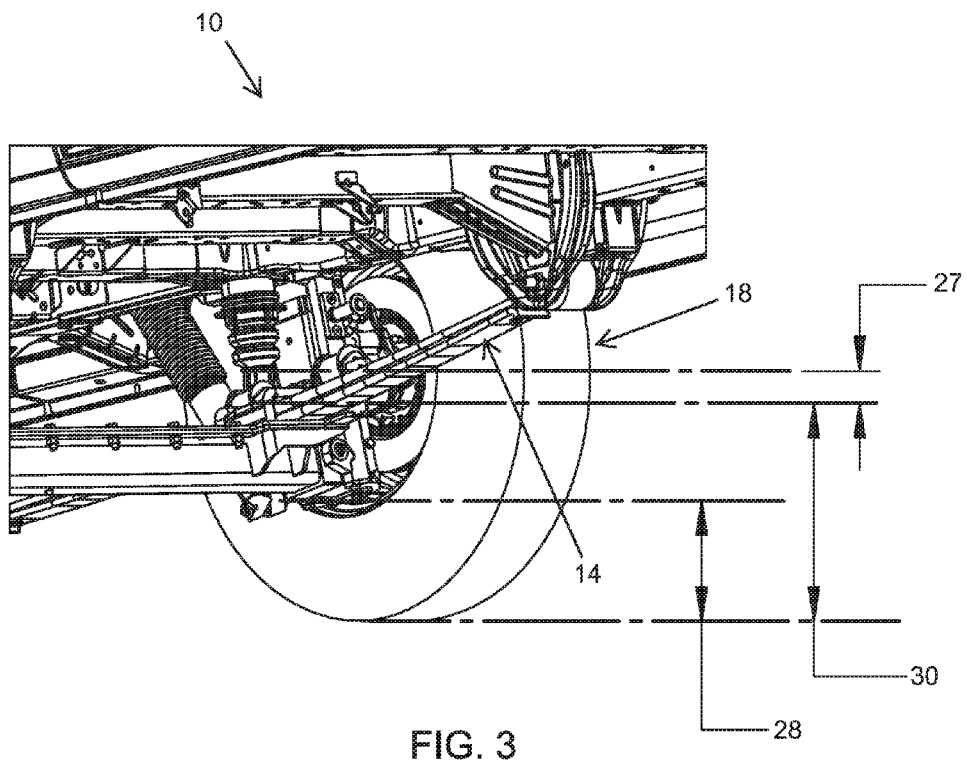
FIG. 3 is a rear perspective view of an actuator of the system supporting a wheel assembly on one side of the vehicle shown in FIG. 1.
Figure 3A:
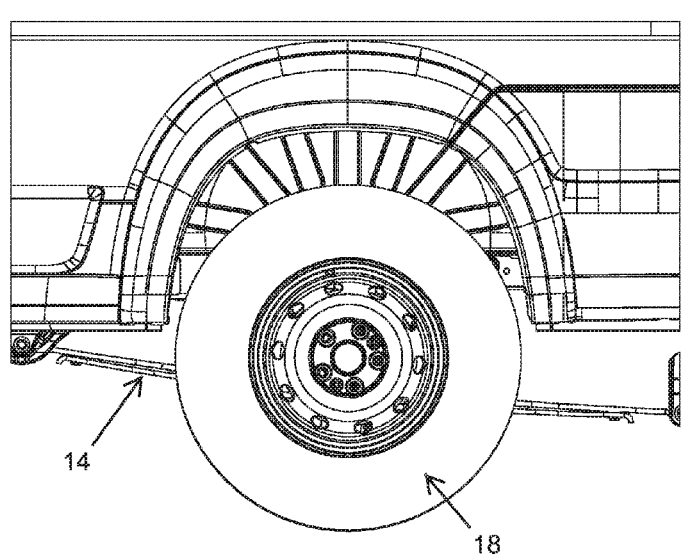
FIG. 3A is a side elevational view of the wheel assembly shown in FIG. 3.
Figure 4:
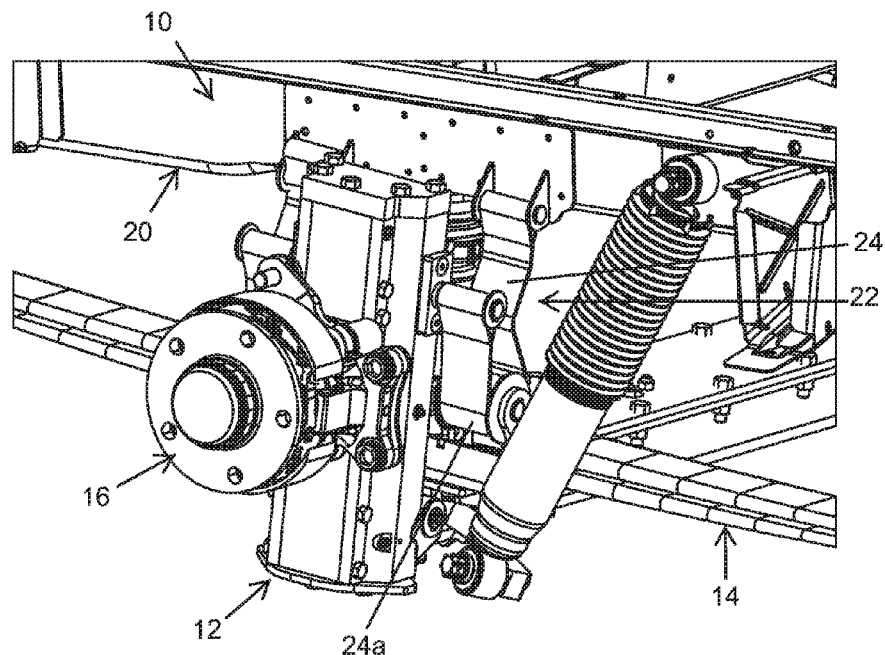
FIG. 4 is a perspective view the system and actuator at one side of the vehicle shown in FIG. 1, illustrating the chassis in a raised or driving position.

The vehicle height adjustment system or device 10 also includes a compression mechanism 22, shown for example in FIG. 4, that compresses the suspension component 14 beyond the compression applied by the vehicle due to gravity, such that the additional compression can allow the chassis 20 to be lowered beyond the available height adjustment range or natural ground clearance of the vehicle. In one embodiment, a compression mechanism 22 includes a flexible connector 24, such as a fabric strap or metallic cable or the like, that attaches between a connector attachment or support post 54 at the movable portion 12b of the actuator 12 and a connector attachment or support post 56 at the chassis 20 of the vehicle, with an intermediate section 24a of the flexible connector 24 engaging a coupling 26, such as a roller, secured relative to or at the suspension component 14. Upward extension or movement of the movable portion 12b relative to the base portion 12a of the actuator 12 moves the end of the flexible connector at the connector attachment 54 towards the end of the flexible connector at the connector attachment 56, thereby causing the flexible connector 24 to pull at the coupling 26 to compress the suspension component 14 and reduce the spacing of the chassis 20 from the ground surface that is provided by the stroke 27 (FIG. 3) of the suspension component 14. Accordingly, the compression mechanism 22 may permit the chassis 20 to be lowered beyond the natural ground clearance 28 (FIG. 3), providing a total high adjustment range 30 that accounts for the suspension stroke 27 and that is capable of lowering the chassis 20 to a desirable height very near to the ground surface.

In the illustrated embodiments, the vehicle height adjustment system or device 10 includes a support beam 32 that spans between suspension components 14 at opposing sides of the vehicle. The illustrated suspension component 14 comprises a leaf spring that attaches at its ends in front of and behind the rear wheel assembly 18 and spans in a downward protruding parabolic shape. It is understood that the system and device 10 may also be adapted to other types of suspension components, including those provided at a front or steerable wheel assembly. As shown in FIG. 3, the actuator 12 is attached at central section of the leaf spring via the support beam 32 that is secured at a lower side of the leaf spring with U-shaped bolts that wrap over the upper side of the leaf spring. Optionally, the support beam may be attached at the upper side of the leaf spring.

The support beam 32 may be installed in place of an axle or axle beam that was an original or factory part of the vehicle. The support beam 32 shown in FIG. 2 includes a lower housing portion 32a that has a hat-shaped cross section defining a channel for housing the hydraulic lines 34 that extend to the actuators 12 at the opposing ends of the support beam 32. Attachment blocks 36 are provided at the opposing ends of the support beam 32 for securely attaching the actuators 12 at a substantially orthogonal orientation relative to the generally horizontally orientated support beam 32. The upper opening of the channel in the lower housing portion 32a is substantially covered by a cover 32b of the support beam 32 that is attached, such as with bolts, to flanges extending along opposing sides of the channel. The opposing ends of the cover 32b each include an upstanding plate with apertures that align with apertures in the attachment blocks 36 to receive bolts that secure the actuators 12 in the desired vertical orientation.

Figure 1:
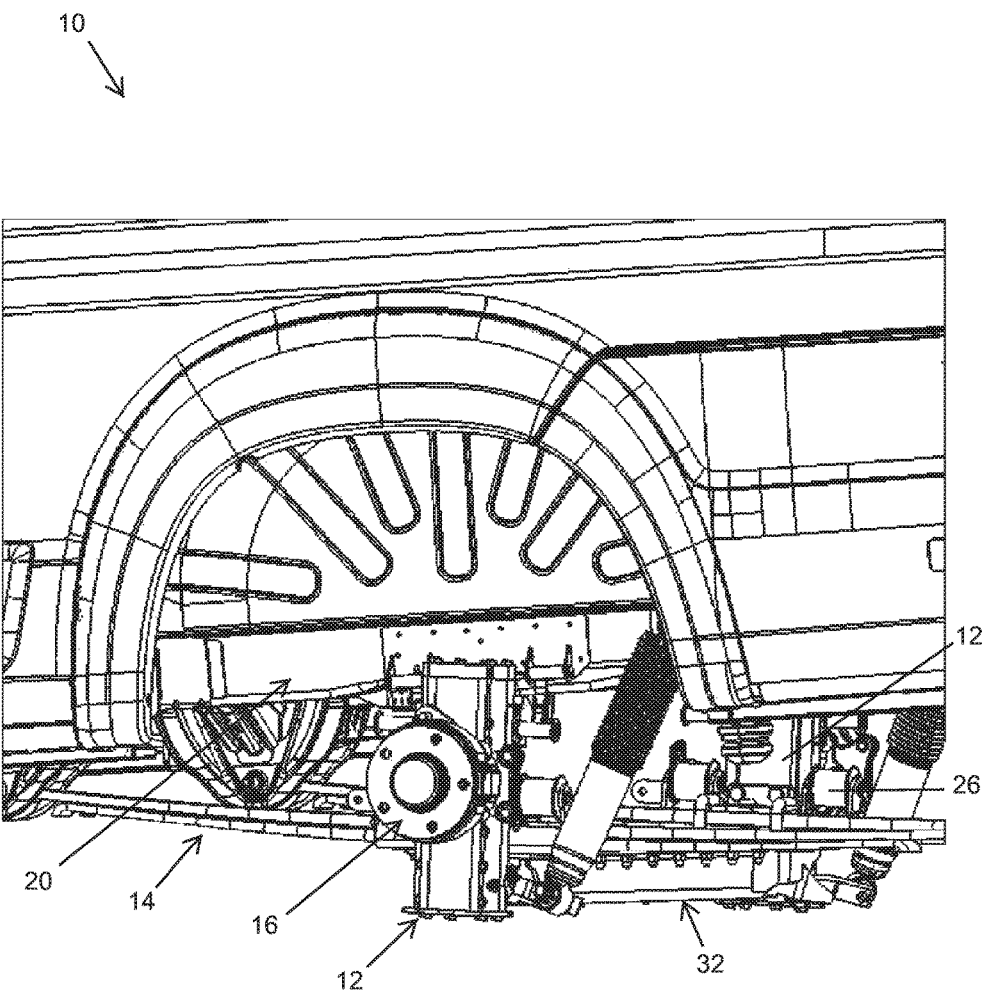
FIG. 1 is a perspective view of a system having a support beam extending between actuators at opposing sides of a vehicle in accordance with the present invention.
Figure 2:
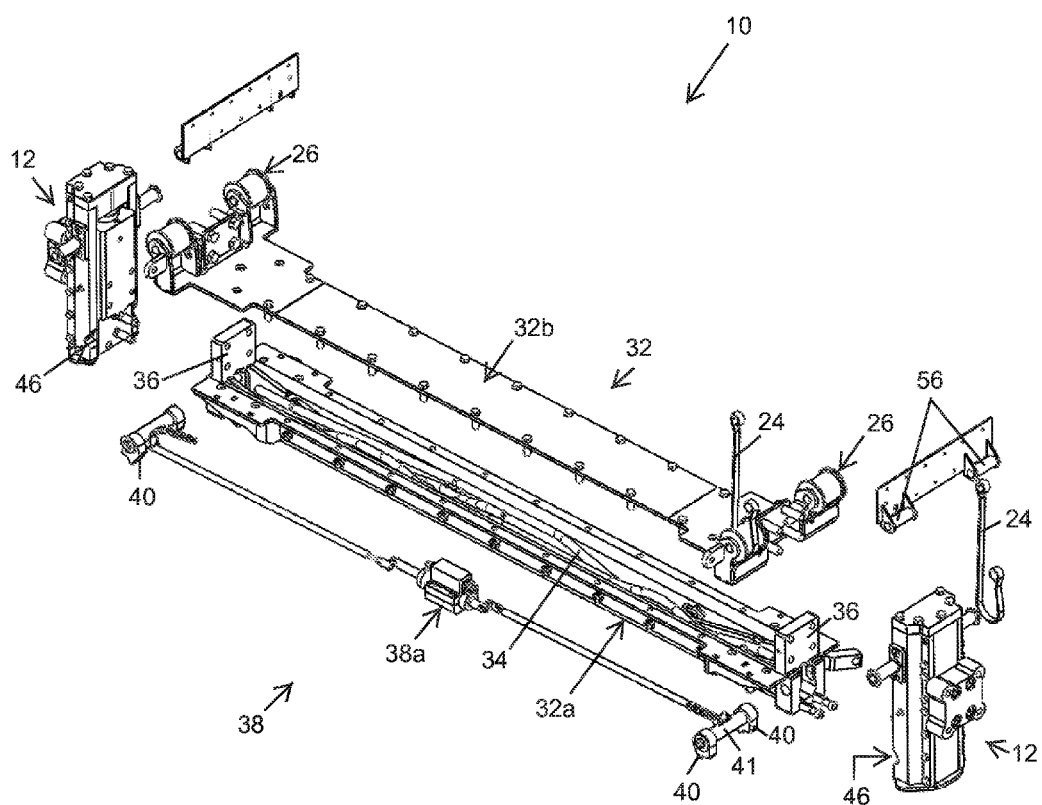
FIG. 2 is an exploded perspective view of the system shown in FIG. 1.
Figure 2A:
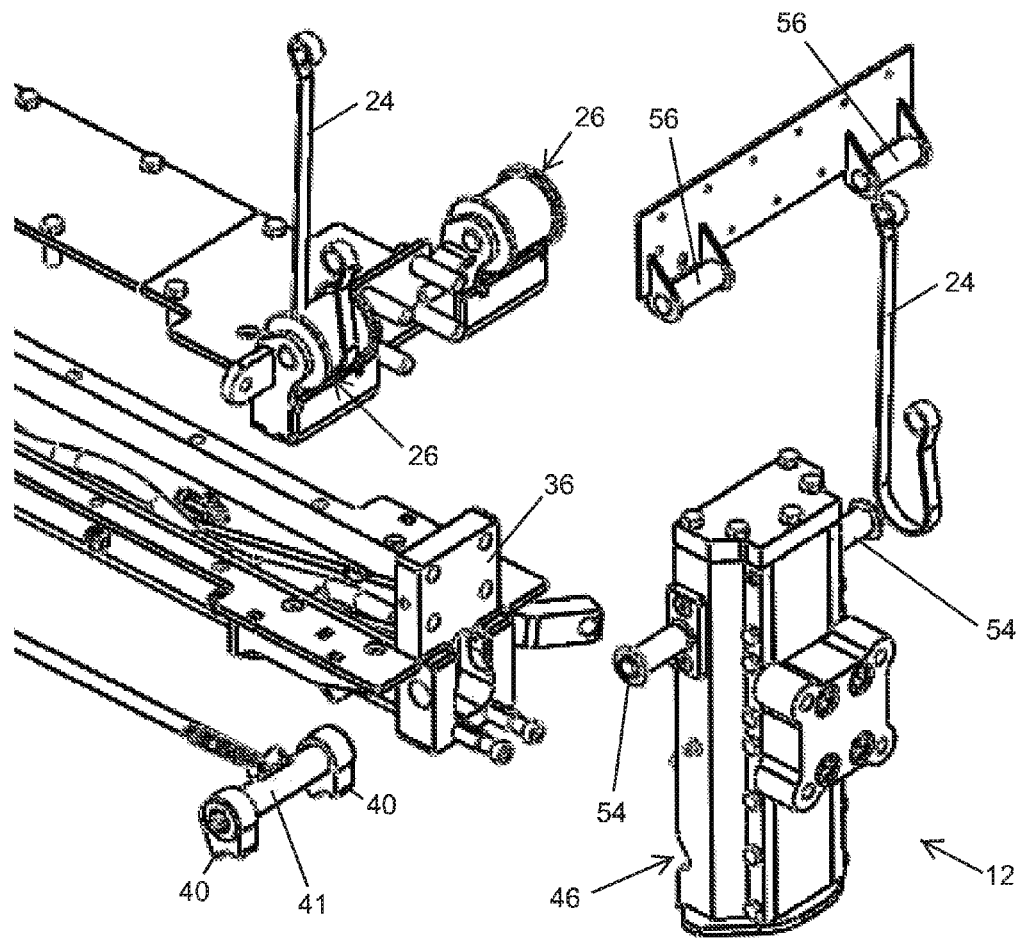
FIG. 2A is an enlarged perspective view of an end region of FIG. 2.

As also shown in FIGS. 2 and 2A, the couplings 26 are disposed at opposing sides of the upstanding plates, at each of the opposing ends of the cover 32b of the support beam. The couplings 26 are configured to engage the flexible connector 24 of the compression mechanism 22, such that the flexible connector 24 can move the support beam 32 toward the chassis 20 and compress the suspension component 14. The couplings may be rotatable or stationary, and are shown as rotatable rollers for movably engaging the illustrated intermediate portions of the straps 24. However, in additional embodiments, the couplings may comprise a simple eyelet, a pulley, or a geared sprocket or the like, such as for engaging other embodiments of flexible connectors, like a rope or cord or chain or toothed belt or the like. The flexible nature of the flexible connector is generally limited to its ability to bend, such as around a roller, not to stretching in its length (although some stretching may occur during operation of the system, but desirably any such stretching is limited). The illustrated flexible connector comprises a polyester webbing or strap, although other fabric materials capable of withstanding high tensile loads may be used.

Figure 6:
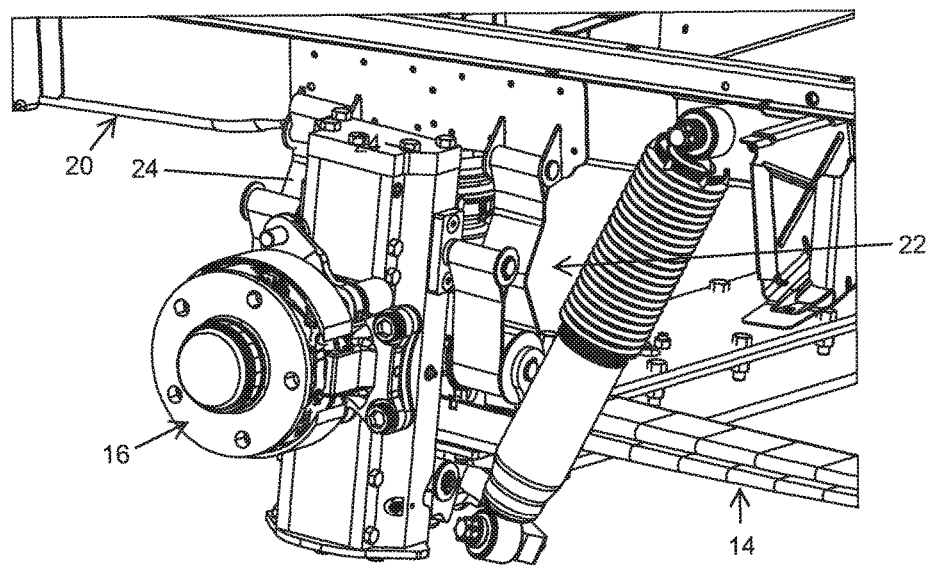
FIG. 6 is a perspective view of the system at one side of the vehicle as shown in FIG. 5, illustrating a locking assembly in an unlocked position.
Figure 6A:
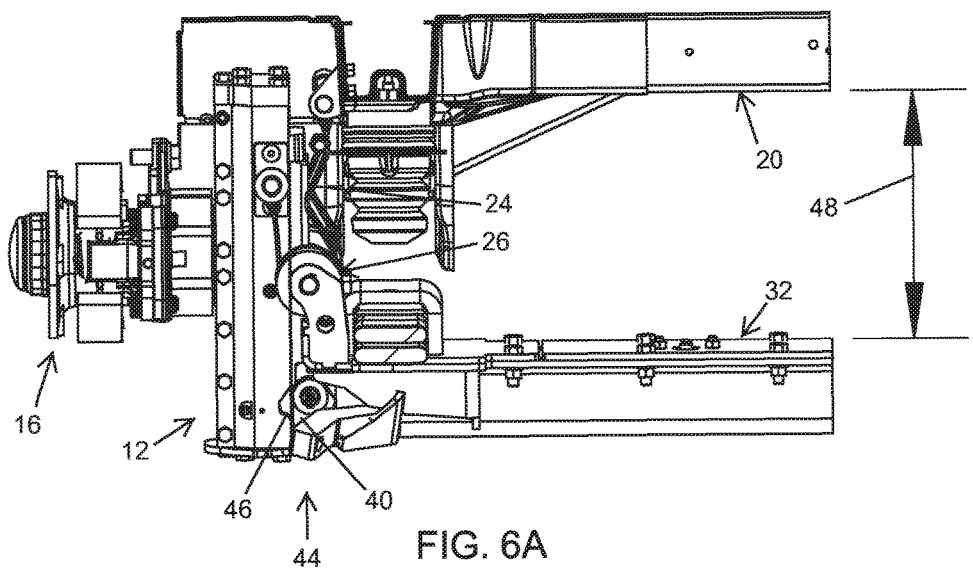
FIG. 6A is a rear elevational view of the system shown in FIG. 6.

With further reference to FIG. 2, the system or device 10 may optionally include a locking assembly 38 that is supported at or near the base portion 12*a* of the actuators 12. The locking assembly 38 may provide an arm 40 that is movable between a locked position 42 (FIG. 4A) that prevents movement of the movable portion 12*b* relative to the suspension 14 and support beam 32 and base portion 12*a*, and an unlocked position 44 (FIG. 6A) that allows or otherwise does not restrict movement of the movable portion 12*b* relative to the suspension 14 and support beam 32 and base portion 12*a*. The locking assembly 38 illustrated in FIG. 2 includes an central actuator 38*a*, such as a hydraulic cylinder or electric motor or solenoid or the like, that is operable, when actuated, to move actuation rods or cables or other tensile members or elements (extending from the central actuator to each shaft of the locking arm) that pull and/or pivot the arms 40 between the locked position 42 (FIGS. 4 and 4A) and unlocked position 44 (FIGS. 6 and 6A). Optionally, the arms may be linearly movable or otherwise located or actuated to adjust between the locked and unlocked positions. Further, it is contemplated that separate locking actuators may be optionally provided at each end of the support beam 32.

Figure 4A:
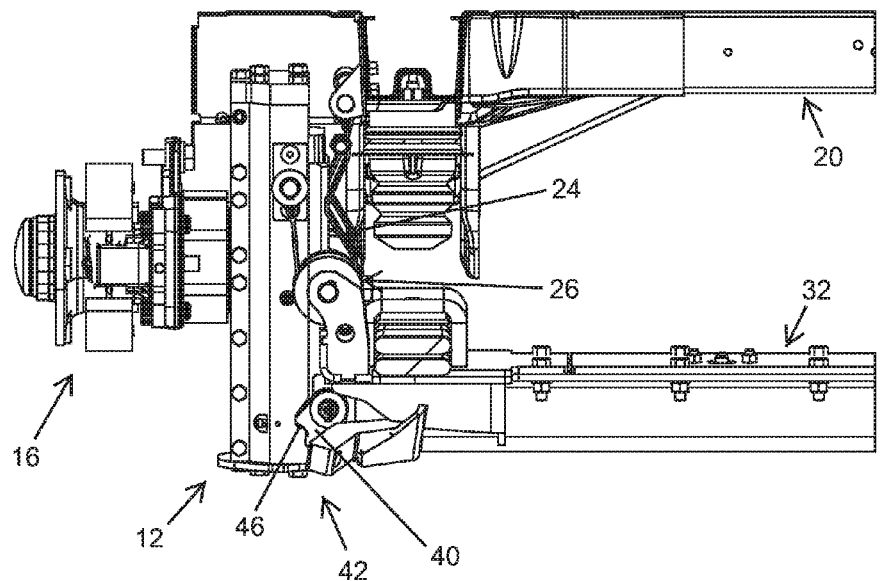
FIG. 4A is a rear elevational view of the system shown in FIG. 4.
Figure 5:
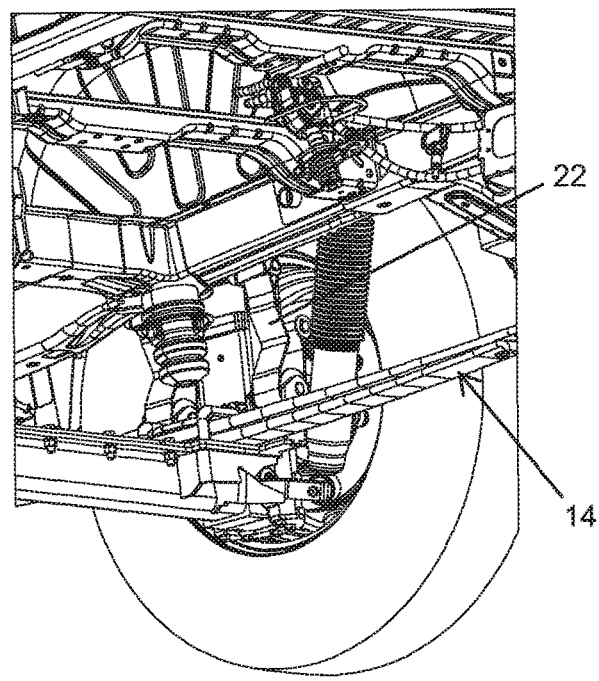
FIG. 5 is a rear perspective view of the system shown in FIG. 1, taken from under the vehicle to show the chassis in a raised or driving position.
Figure 5A:
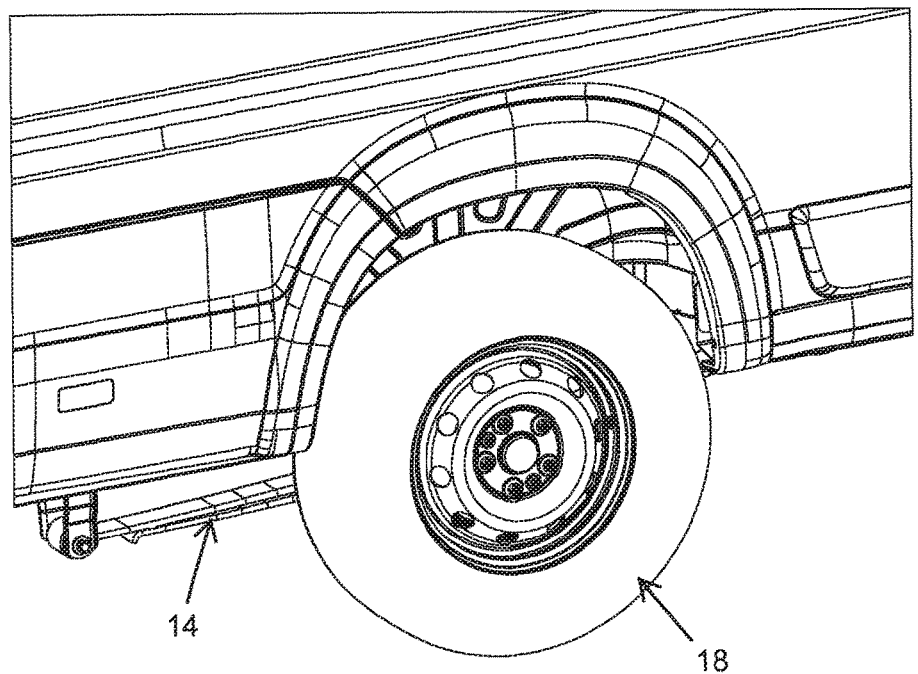
FIG. 5A is a perspective view of the system shown in FIG. 5, taken from a side of the vehicle to show the chassis in the raised or driving position.

The illustrated arms 40 of the locking assembly 38 are provided on opposing sides of the support beam 32 and are pivotable via a shaft 41 that extends through an end portion of the support beam 32. Each arm 40 has a tooth at its end that is shaped to engage a downward slanted notch 46 on an inside edge of the movable portion 12*b* of the actuator 12. As shown in FIGS. 4-4A, the downward shape of the notch provides added stability and engagement with the tooth at the end of the arm 40 from the weight of the vehicle. The end of the arm 40 may optionally have various shapes to engage differently shaped notches or engagement apertures on the actuator. In the locked position 42, as shown in FIG. 5, the fabric strap is loosely extending through the coupling and the movable portion of the actuator is generally fixed relative to the base portion of the actuator, allowing the suspension component to operate in a standard manner flex under the weight the vehicle due to gravity, such as for driving or otherwise operating the vehicle.

Figure 11:
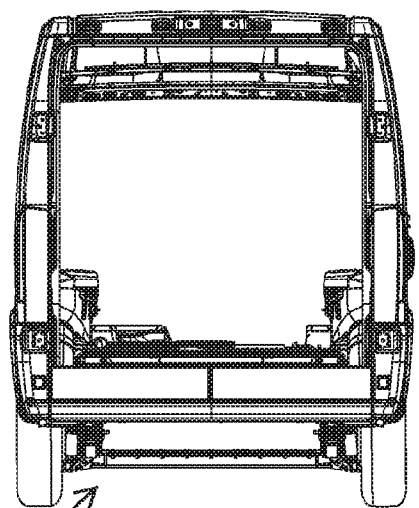
FIGS. 11-13 are rear perspective views of the vehicle having the system shown positioning the chassis at various adjustment heights corresponding with FIGS. 6, 7, and 9, respectively.
Figure 12:
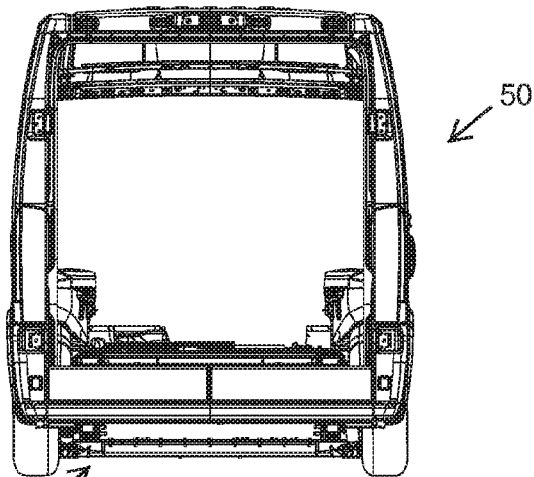
Figure 13:
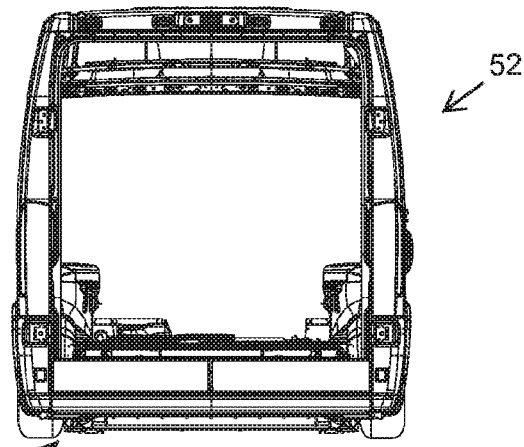

Upon preparing to lower the chassis from its standard operating position, the locking assembly 38 may be operated to actuate the central actuator 38*a* for moving the arms 40 into the unlocked position 44, as shown for example in FIGS. 6-6A. Optionally, and desirably, the actuator 12 may be actuated to lower the movable portion 12*b* slightly before the locking arms 40 are disengaged (to ease the disengagement of the locking arms at the movable portion 12*b*). In the unlocked position 44, the arms 40 are moved or pivoted downward out of the notches 46 in the movable portion 12*b* of the actuator 12. With the ends of the arms 40 disengaged from the notches 46, the movable portion 12*b* is free to move vertically relative to the base portion 12*a* and the arms 40. It is understood that each arm 40 may disengage from the respective notch 46 at both rear wheel assemblies 18 substantially simultaneously, such that the actuators at each rear wheel can be operated together to lower the rear portion of the vehicle, such as shown in FIGS. 11-13.

Figure 7A:
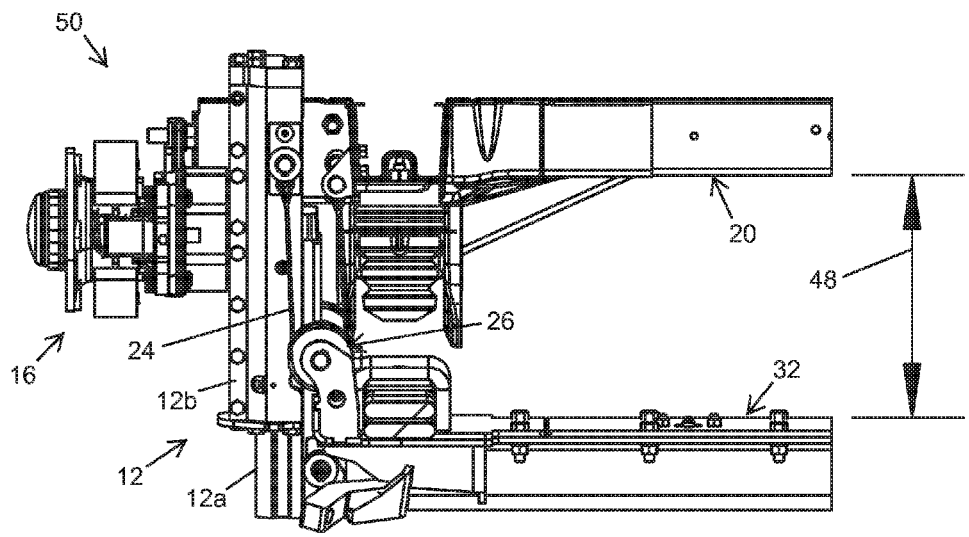
FIG. 7A is a rear elevational view of the system shown in FIG. 7.
Figure 8:
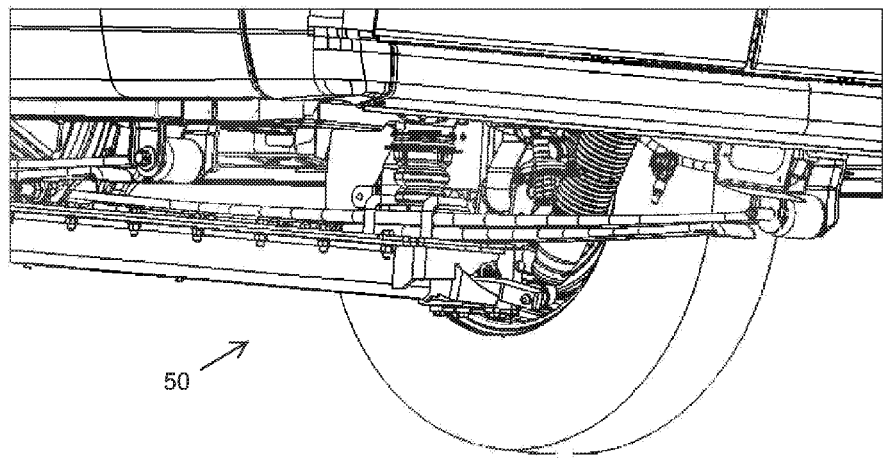
FIG. 8 is a perspective view of the system shown in FIG. 7, taken from under the vehicle to show the chassis at the first lowered position or a position that has generally not compressed the suspension component.
Figure 8A:
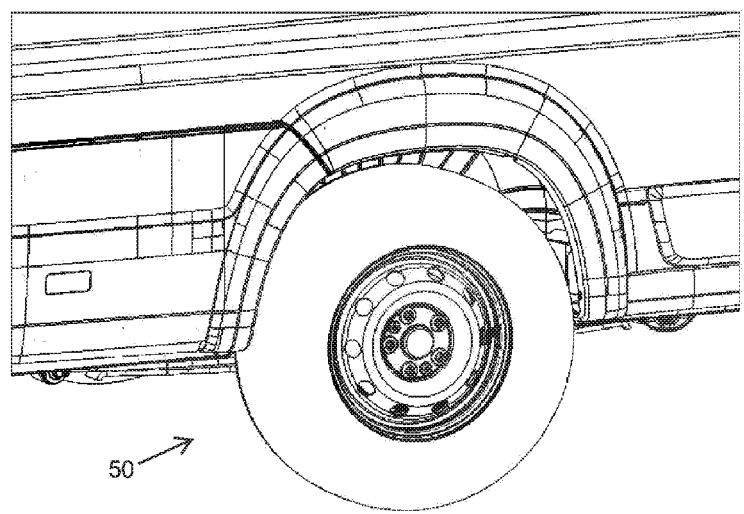
FIG. 8A is a perspective view of the system shown in FIG. 8, taken from a side of the vehicle to show the chassis at the first lowered position or a position that has generally not further compressed the suspension component.

Referring now to FIGS. 7-8A, when the locking assembly is actuated to unlock the actuators, the chassis 20 is lowered to a first lowered position 50 that is defined by operating the actuator 12 to lower the chassis 20 prior to or without compressing the suspension component 14 beyond its loaded condition from the weight of the vehicle and its contents. For instance, and such as can be seen when comparing FIGS. 6A and 7A, the vertical spacing or distance 48 between the chassis 20 and the support beam 32 that is generally occupied by the suspension component remains substantially the same in both the loaded or driving or raised position (FIG. 6A) and the first lowered position 50 (FIG. 7A). To move to the first lowered position 50, the movable portion 12*b* of the actuator 12 is moved upward relative to the base portion 12*a*, thereby extending the actuator 12 to position the hub assembly 16 (and associated wheel) closer to the upper surface of the wheel well, which results in the support beam 32 and chassis 20 moving closer to the ground surface. The first lowered position 50 is achieved when the movable portion 12*b* is raised to a position that causes the flexible connector 24 or strap to become taut and may be loaded with some initial tension prior to compressing the suspension component 14.

Figure 9:
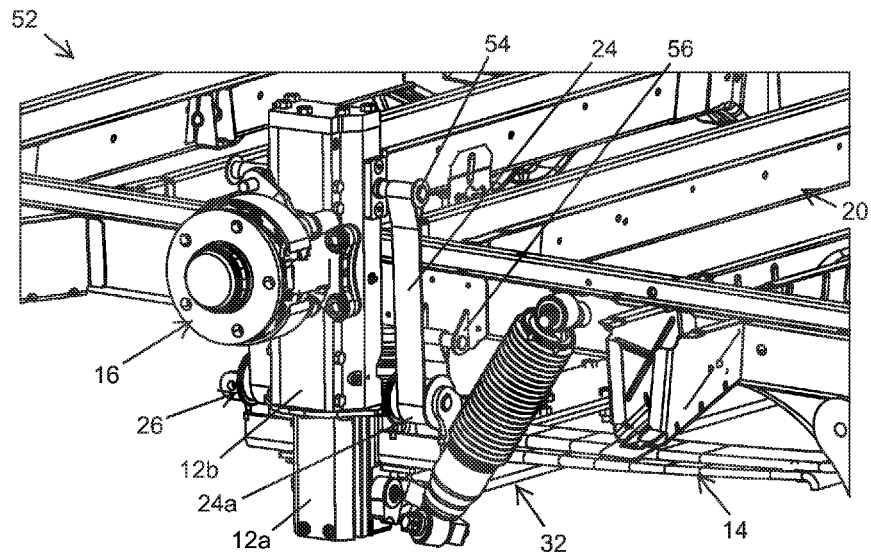
FIG. 9 is a perspective view of the system shown in FIG. 6, illustrating the chassis at a second lowered position that has further compressed the suspension component.
Figure 9A:
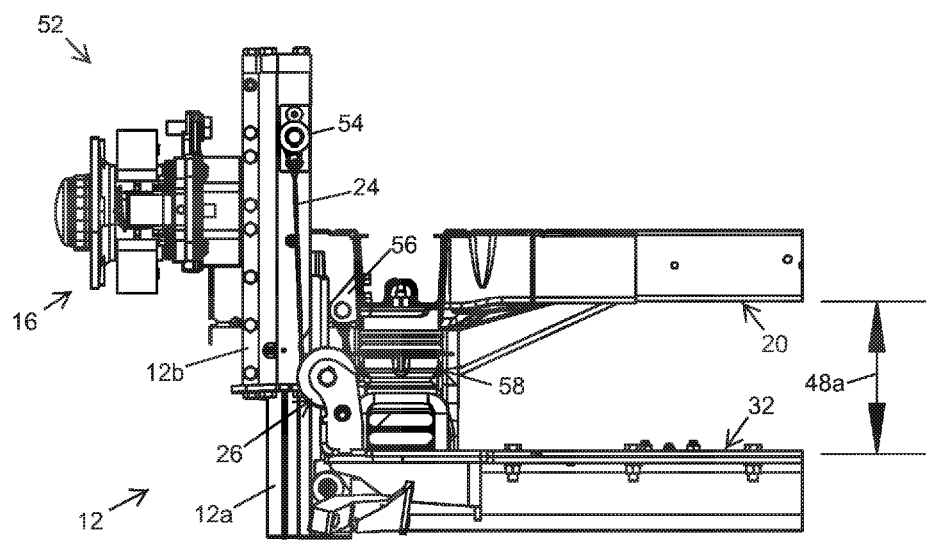
FIG. 9A is a rear elevational view of the system shown in FIG. 9.
Figure 10:
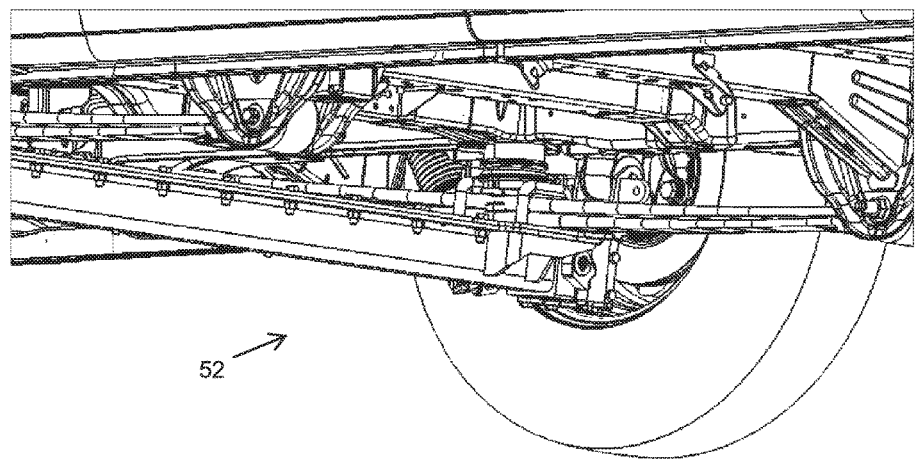
FIG. 10 is a perspective view of the system shown in FIG. 9, taken from under the vehicle to show the chassis at the second lowered position that has further compressed the suspension component.
Figure 10A:
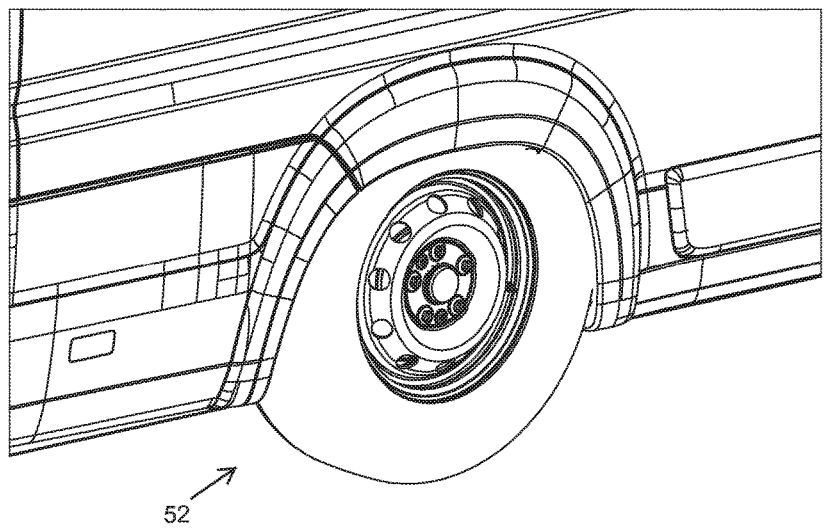
FIG. 10A is a perspective view of the system shown in FIG. 10, taken from a side of the vehicle to show the chassis at the second lowered position.

When moving from the first lowered position 50 to the second lowered position 52, as shown in FIGS. 9-10A, the suspension component 14 is compressed while the actuator 12 continues to extend and allow the wheel to move further into the upper area of the wheel well and closer to the wheel well's upper surface. The compression of the suspension component 14 provides additional lowering range define by the stroke 27 (FIG. 3) of the suspension component 14, which is limited by an upper bumper or stop pad 58 protruding down from the chassis 20 to contact the suspension component 14 in the fully compressed position. The compression mechanism 22 may be integrated with the actuator for lowering the wheel assembly relative to the support beam 32, as provided in the illustrated embodiment, or may be a separate device that is used to compress and hold the suspension component in a compressed condition at any time prior, during, or after the actuator is operated to lower the chassis.

As illustrated in FIG. 9, the compression mechanism 22 include the flexible connector 24 attached at one end to the attachment or support post 54 protruding horizontally from the side of the movable portion 12*b* of the actuator 12. The opposing end of the flexible connector 24 is similarly attached at attachment post or hanger bracket 56 that is disposed at (such as via fasteners or the like) a lower portion or frame component of the chassis 20. The illustrated hanger bracket 56 includes a horizontal shaft connected between flanges of the bracket to form secure attachment point of the flexible connector. In the illustrated strap embodiment of the flexible connector 24, loops are provided at the ends of the strap to engage the support post 54 and shaft of the hanger bracket 56, whereby the intermediate section 24*a* of the strap is movably engaged or otherwise threaded through the coupling 26, shown as a roller, which is secured to the support beam 32 at the suspension component 14. To provide balanced compression, a strap is provided at both sides of the actuator. It is understood that the flexible connector 24 may be otherwise attached at the movable portion 12b of the actuator 12 and/or at the chassis 20, such as by attaching to integral portions of either structure or being directly bolted or fastened to the respective structure.

When in the first lowered position 50 and extending the actuator 12 or moving the movable portion 12b further upward relative to the base portion 12a toward the second lowered position 52, the flexible connector 24 is placed under tension to compress the suspension component toward the chassis 20. In this transition, the intermediate section 24a of the flexible connector 24 moves along the coupling 26, such as by rotating the illustrated roller. The corresponding tension on the strap from the compressed suspension component is evenly distributed to the sections of the strap on opposing sides of the roller coupling 26. The illustrated coupling 26 is designed to position the outside diameter of the roller in substantially tangential alignment with the linear path of travel of the actuator 12, which is shown in a generally vertical orientation. This substantial alignment prevents added torque on the actuator during further compression of the suspension component that may cause wear or damage to the actuator 12.

The system or device of the present invention thus vertically moves the wheel assemblies relative to the suspension and chassis of the vehicle, which allows the system to operate when the vehicle is parked and without requiring any rotation of the wheels during raising and lowering of the vehicle chassis. Thus, the parking brake can be applied during the raising and lowering of the vehicle chassis, providing enhanced safety during operation of the raising and lowering system or device.

As shown in FIGS. 11-13, the actuator 12 operates to lower the chassis 20 from its loaded or driving position (FIG. 11) to a first lowered position (FIG. 12) by moving the wheel assembly 18 toward the chassis 20, where the flexible connector 24 is placed in initial tension, and to a second lowered position (FIG. 13) by moving the wheel assembly further toward the chassis, where the suspension component is compressed toward the chassis by the flexible connector 24. In the second lowered position, a rear opening of a vehicle, such as shown in FIG. 13, is close to the ground surface and the bumper is at or similarly close to touching the ground surface to allow for ease in loading and unloading the vehicle through the rear opening. The device 10 therefore can be bolted or otherwise easily attached to the vehicle in a manner that allows at least one suspension component to be compressed for lowering the chassis and moving the vehicle's corresponding wheels into the available space provided at an upper area of the wheel well, without necessarily modifying the vehicle body structure or wheel well, such as by cutting, welding, painting, or other substantially permanent modifications. Because the wheel assemblies are attached at the actuators, the system or device of the present invention replaces the rear (or optionally front) axle of the vehicle, which allows for further upward movement of the wheel assemblies into the wheel well.

Optionally, the actuator 12 may include one or more locking mechanisms in addition to or in the alternative to the locking assembly 38 that moves the arms 40 between the locked and unlocked positions 42, 44 that respectively prevent or allow the movable portion 12b to initially move relative to the base portion 12a of the actuator 12. As shown in FIGS. 14-18B, the actuator 12 of the vehicle height adjustment system 10 may include a primary hydraulic lock 60 and a secondary mechanical lock 62 as a back-up to ensure that the vehicle remains in the ride or raised position when in the drive mode. The primary hydraulic lock and the secondary mechanical lock may be incorporated with the actuator 12.

Figures 14, 14A:
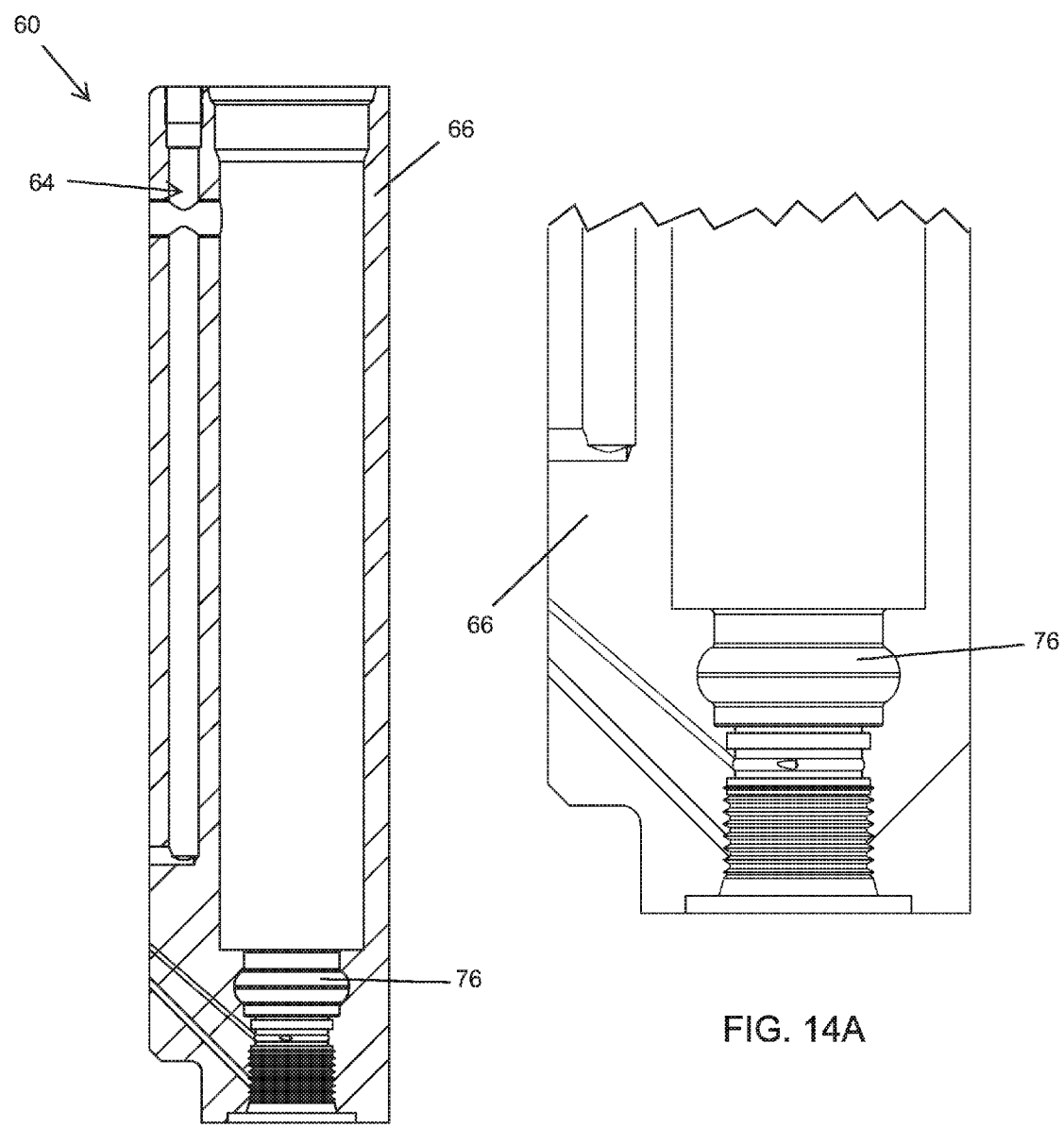
FIG. 14 is a cross-sectional view of a cylinder body of an actuator for a vehicle height adjustment system.
FIG. 14A is an enlarged view of a portion of the cylinder body shown in FIG. 14.

The primary hydraulic lock 60 incorporates a hydraulically operated cartridge type insert lock valve 64 that is integrated into the main hydraulic cylinder 66 of the actuator 12, as shown in FIGS. 14 and 14A. The insert lock valves 64 require pilot pressure applied to them from a hydraulic pump of the vehicle to allow fluid flow out of the cylinders 66 to permit cylinder rod extension and vehicle lowering. It is contemplated that the insert lock valve 64 may be provided at various location within the hydraulic cylinder or hydraulic system of the vehicle.

Figures 15, 15A, 15B:
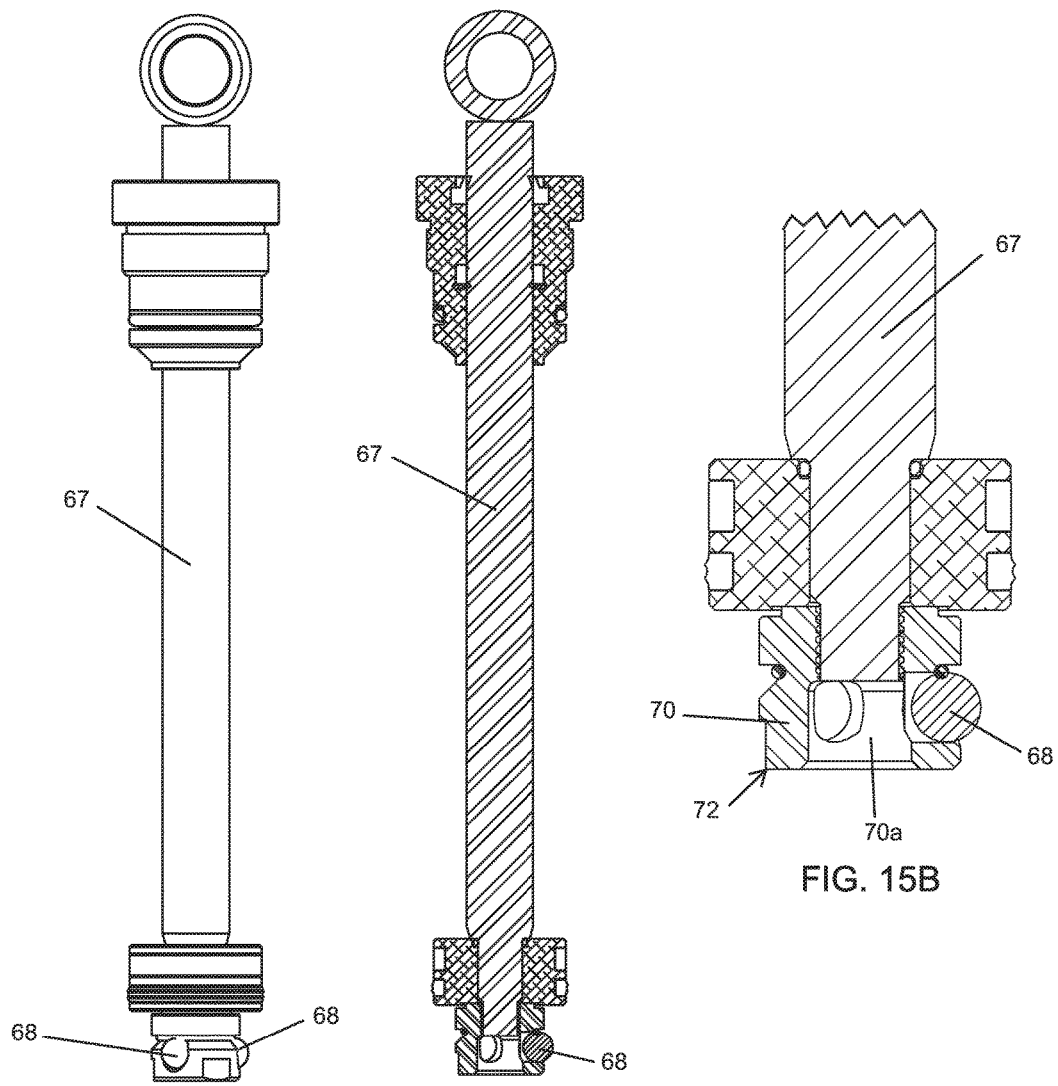
FIG. 15 is an elevational view of a piston cylinder that is received in the cylinder body shown in FIG. 14.
FIG. 15A is a cross-sectional view of the piston cylinder shown in FIG. 15.
FIG. 15B is an enlarged view of a portion of the cylinder body shown in FIG. 15A.
Figure 16:
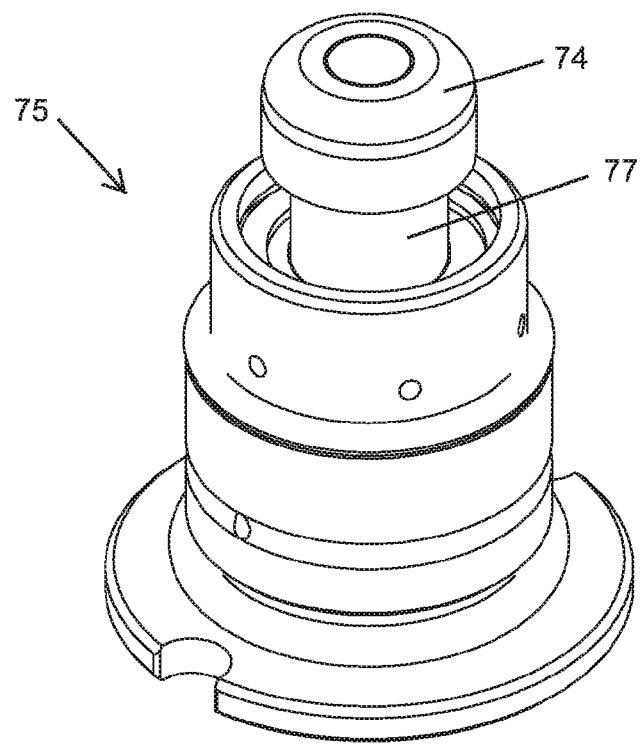
FIG. 16 is a perspective view of a ram assembly 75 that attaches to the cylinder body show in FIG. 14.
Figure 16A:
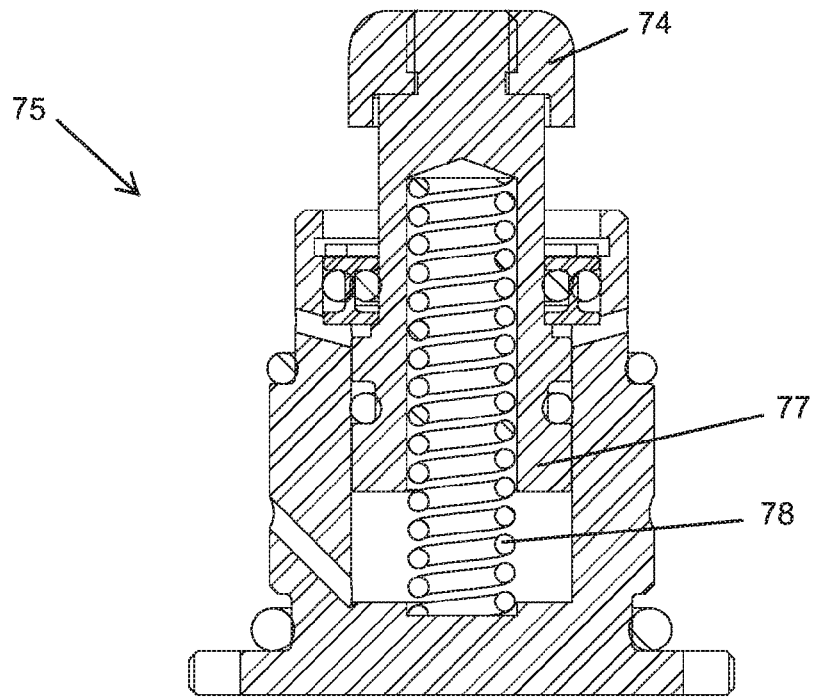
FIG. 16A is a cross-sectional view of the ram assembly shown in FIG. 16.
Figure 17:
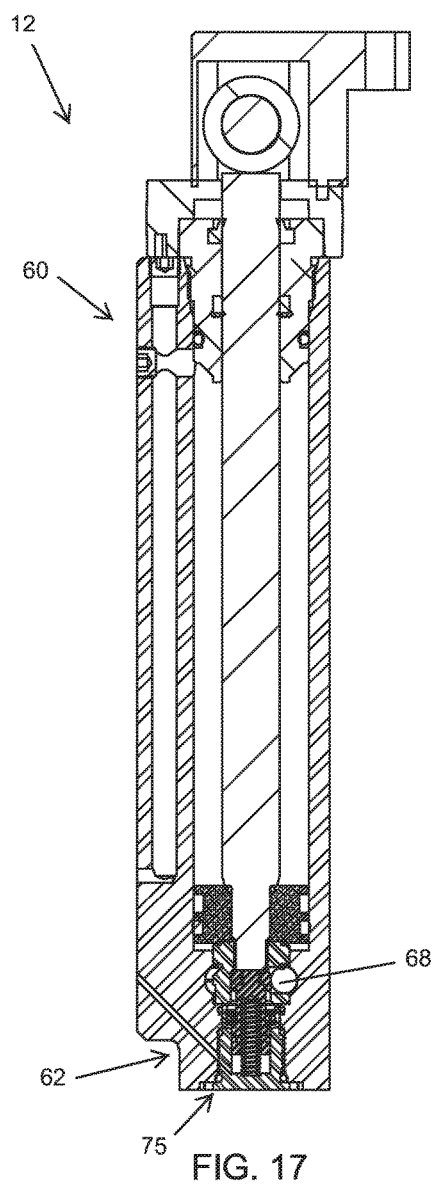
FIG. 17 is a cross-sectional view of the cylinder body assembled with the piston cylinder and ram assembly shown in FIGS. 14-16A, illustrating a locked position.
Figure 17A:
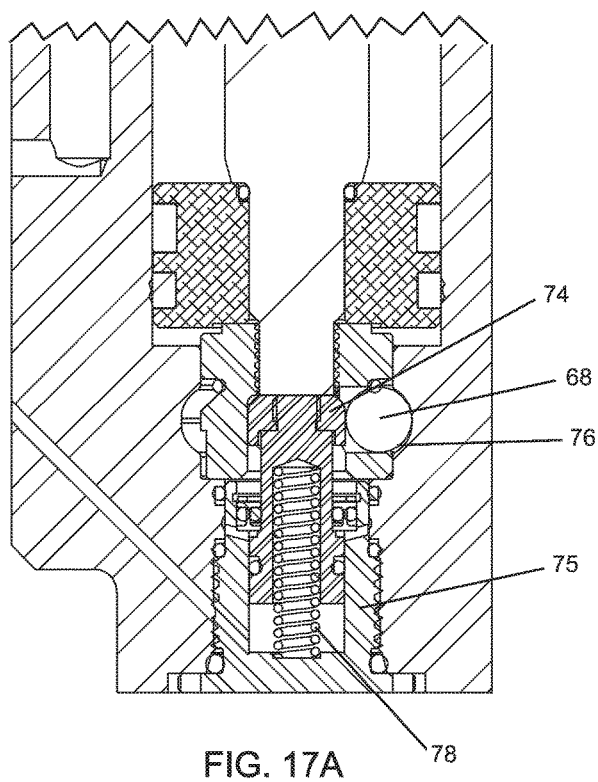
FIG. 17A is an enlarged view of a portion of the cylinder body, the piston cylinder, and ram assembly shown in FIG. 17.

The secondary lock 62 is provided to ensure that the vehicle remains in the ride or raised position in case of a hydraulic failure. In the illustrated embodiment, the secondary lock 62 incorporates a plurality of steel balls 68, such as shown in FIGS. 15-15B with three balls, encapsulated in a ball housing 70 of a retaining nut 72 at the lower end of the piston or cylinder rod 67. To lock the cylinder 67 to prevent the cylinder from moving relative to the hydraulic cylinder body 66 with the secondary lock 62, such as shown in FIGS. 17 and 17A, the secondary lock 62 holds the steel balls 68 outwards by a cylindrical ram 74 of a ram assembly 75 that occupies an inner area 70a of the ball housing 70 to keep to the balls 68 engaged in a groove 76 inside each main hydraulic cylinder body. The ram assembly 75, as shown in FIGS. 16 and 16A, includes a spring 78 attached to the ram 74 to provide upward spring pressure to keep the ram 74 in position in the center inner area 70a of the encapsulating ball housing 70, thus not allowing the balls 68 to retract from the retaining groove 76 and further not allowing the main cylinder to extend (for lowering the vehicle), such as in the case of a hydraulic failure or malfunction.

Figure 18:
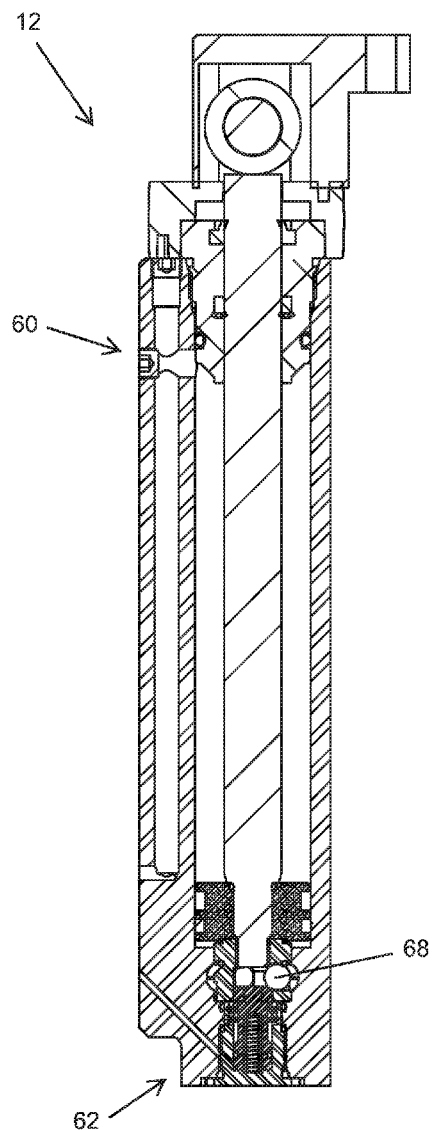
FIG. 18 is a cross-sectional view of the cylinder body, the piston cylinder, and ram assembly shown in FIG. 17, illustrating an unlocked position.
Figure 18A:
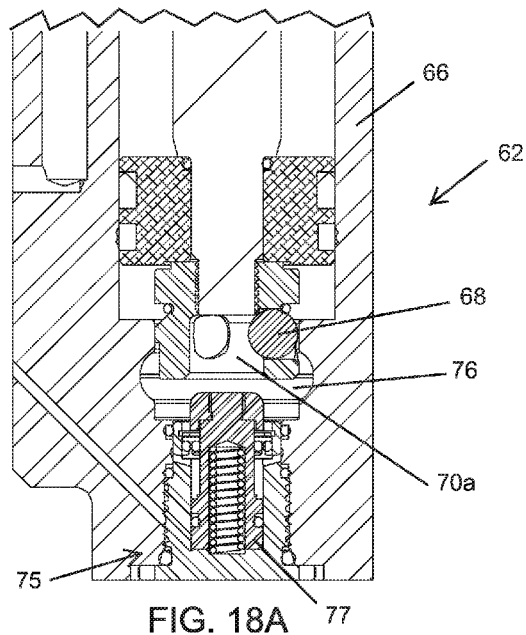
FIG. 18A is an enlarged view of a portion of the cylinder body, the piston cylinder, and ram assembly shown in FIG. 18, illustrating a further unlocked position.
Figure 18B:
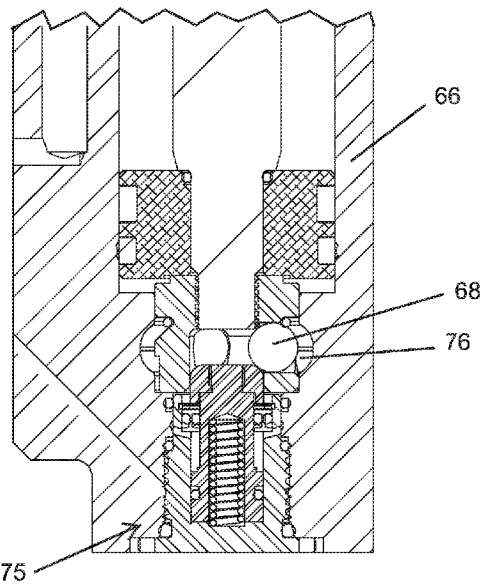
FIG. 18B is an enlarged view of a portion of the cylinder body, the piston cylinder, and ram assembly shown in FIG. 18.

To unlock the cylinder 67 to allow moving relative to the hydraulic cylinder body 66 of each of the actuators 12, an unlock function of a control pendant may be activated, such as to direct hydraulic flow to the hydraulic cylinder of the secondary lock 62 that is housed in the bottom of each main hydraulic cylinder 66. As shown in FIG. 18B, the hydraulic flow causes the ram 74 to be forced downwards, against the spring 78, to retract from interior area 70a of the ball housing 70, thus allowing the balls 68 to move freely inward toward the center interior area 70a of ball housing 70 and out of locking groove 76, such as shown in FIG. 18B. When the hydraulic cylinder 77 of the secondary lock 62 bottoms out, such as shown in FIGS. 18-18B, the hydraulic pressure increases in the pilot line and opens a sequence valve to direct flow to the pilot operated cartridge type insert lock valve of the primary hydraulic lock 60 in each main hydraulic cylinder. This allows fluid to flow from the top of the cylinder 67, which allows the cylinder 67 to extend and the vehicle to be lowered, as described above.

When the vehicle is raised back to the ride position, the main hydraulic cylinders retract to the bottom of their stroke where each ball lock housing aligns with the retaining groove. Spring pressure returns the ram into the center interior area of the ball housing to force the balls into groove, thus resetting the mechanical back-up lock of the secondary lock 62. The primary lock 60 is automatically locked without pilot pressure applied to unlock circuit.

Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. An apparatus for raising and lowering a vehicle that is supported by a wheel suspended from a frame of the vehicle by a suspension component, said apparatus comprising:
a linear actuator that is vertically oriented to move the wheel of the vehicle relative to the frame of the vehicle;
a compression device arranged to compress the suspension component of the vehicle responsive to the movement of the wheel by the linear actuator; and
wherein the linear actuator comprises (i) a base portion configured to attach at the suspension component and (ii) a movable portion movably coupled with the base portion and configured for mounting the wheel.

2. The apparatus of claim 1, wherein the linear actuator is configured to move the wheel toward the frame of the vehicle to a first lowered position, and wherein the compression device is configured to compress the suspension component and to move the wheel toward the frame of the vehicle to a second lowered position.

3. The apparatus of claim 1, wherein the movable portion of the linear actuator is configured to support a hub assembly that rotatably supports the wheel of the vehicle.

4. The apparatus of claim 1, wherein the compression device comprises a strap comprising polyester webbing.

5. The apparatus of claim 1, wherein the linear actuator comprises a locking assembly supported at or near a base portion of the linear actuator, and wherein the locking assembly includes an arm movable between an unlocked position and a locked position that prevents movement of a movable portion of the linear actuator relative to the base portion.

6. The apparatus of claim 1, wherein the base portion of the linear actuator is configured to attach at or near a center area of a leaf spring of the suspension component.

7. An apparatus for raising and lowering a vehicle that is supported by a wheel suspended from a frame of the vehicle by a suspension component, said apparatus comprising:
a linear actuator that is vertically oriented to move the wheel of the vehicle relative to the frame of the vehicle;
a compression device arranged to compress the suspension component of the vehicle responsive to the movement of the wheel by the linear actuator; and
wherein the compression device comprises a flexible connector attached between the linear actuator and the frame of the vehicle.

8. The apparatus of claim 7, wherein an intermediate portion of the flexible connector is movably engaged with a coupling disposed at the suspension component, and wherein the flexible connector is placed in tension to compress the suspension component toward the frame of the vehicle.

9. An apparatus for raising and lowering a vehicle that is supported by a wheel suspended from a frame of the vehicle by a suspension component, said apparatus comprising:
a linear actuator having a base portion configured to attach at a suspension component of the vehicle and a movable portion operably coupled with the base portion and configured to mount a wheel; and
a flexible connector having a first end attached at the movable portion of the actuator and a second end configured to attach at the frame of the vehicle, wherein the flexible connector engages a coupling configured to be disposed at the suspension component;
wherein the linear actuator is operable to generally vertically move the wheel toward the chassis to a first lowered position, and wherein, when the flexible connector is placed in tension, the suspension component is compressed toward the chassis to move the wheel further toward the chassis to a second lowered position.

10. The apparatus of claim 9, further comprising a hub assembly attached at the movable portion of the actuator for rotatably supporting the wheel of the vehicle.

11. The apparatus of claim 9, wherein the flexible connector comprises a fabric strap, and wherein an intermediate portion of the flexible connector is movably engaged with the coupling configured to be disposed at the suspension component.

12. The apparatus of claim 9, further comprising a locking assembly supported at or near the base portion of the linear actuator, wherein the locking assembly is operable between an unlocked condition that does not restrict movement of the movable portion relative to the base portion and a locked condition that prevents movement of the movable portion relative to the base portion.

13. The apparatus of claim 9, wherein the linear actuator comprises a base portion configured to attach at or near a center area of a leaf spring of the suspension component.

14. A system for raising and lowering a vehicle that is supported by a wheel suspended from a frame of the vehicle by a suspension component, said system comprising:
a linear actuator attached at the suspension component of the vehicle, wherein the linear actuator comprises a movable portion that supports the wheel;
a flexible connector attached between the movable portion of the actuator and the frame of the vehicle, wherein the flexible connector is movably engaged with a coupling disposed at the suspension component;
wherein the linear actuator is operable to generally vertically move the wheel assembly toward the frame to a first lowered position, and wherein the linear actuator is operable to place the flexible connector in tension to compress the suspension component to move the wheel assembly further toward the frame to a second lowered position.

15. The system of claim 14, further comprising:
a support beam that spans between suspension components on opposing sides of the vehicle; and
a second linear actuator disposed at the suspension component at the opposing side of the vehicle, wherein the linear actuators attach at the support beam.

16. The system of claim 14, wherein the wheel is a rear wheel of the vehicle, such that the first and second lowered positions move a rear section of the frame closer to a ground surface for loading and unloading the vehicle.

17. The system of claim 14, wherein the linear actuator includes a locking mechanism having a primary lock with a check valve and a secondary lock that mechanically interfaces with a cylinder of the actuator, and wherein the locking mechanism is configured to selectively move to a locked position for preventing movement of the movable portion relative to the base portion.

18. The system of claim 14, wherein the suspension component of the vehicle includes a leaf spring, and wherein a base portion of linear actuator is disposed at a center area of the leaf spring.

* * * * *